No. 894,131. PATENTED JULY 21, 1908.
A. S. FREDERICK.
VEHICLE AXLE.
APPLICATION FILED FEB. 27, 1908.

Witnesses:
C. E. Smith.
Fenton S. Belt

Inventor:
Atlanta S. Frederick,
By Sm. Ruggin & Co.
Attorneys

UNITED STATES PATENT OFFICE.

ATLANTA S. FREDERICK, OF KIRKSVILLE, ILLINOIS.

VEHICLE-AXLE.

No. 894,131.  Specification of Letters Patent.  Patented July 21, 1908.

Application filed February 27, 1908. Serial No. 418,062.

*To all whom it may concern:*

Be it known that I, ATLANTA S. FREDERICK, a citizen of the United States, residing at Kirksville, in the county of Moultrie and State of Illinois, have invented certain new and useful Improvements in Vehicle-Axles, of which the following is a specification.

This invention relates to vehicle axles, and it has for its object to provide an axle having a spindle of simple and economical construction which shall be capable of ready adjustment to a wide or a narrow gage, as may be required; further objects being to simplify and improve the construction and operation of this class of devices.

With these and other ends in view which will readily appear as the nature of the invention is better understood, the same consists in the improved construction and novel arrangement and combination of parts which will be hereinafter fully described, and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to, when desired.

Figure 1:
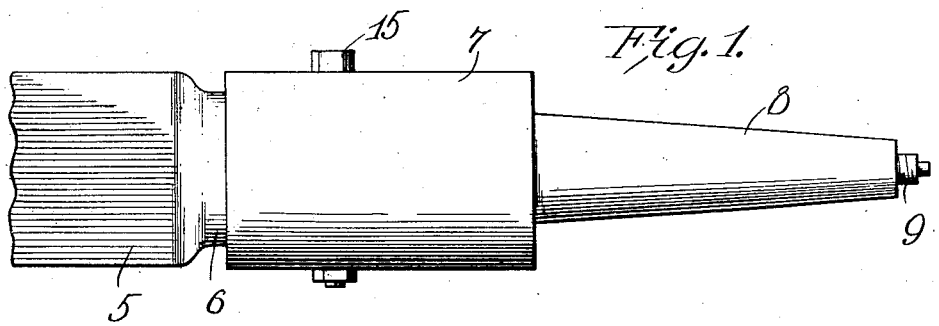
Figure 2:
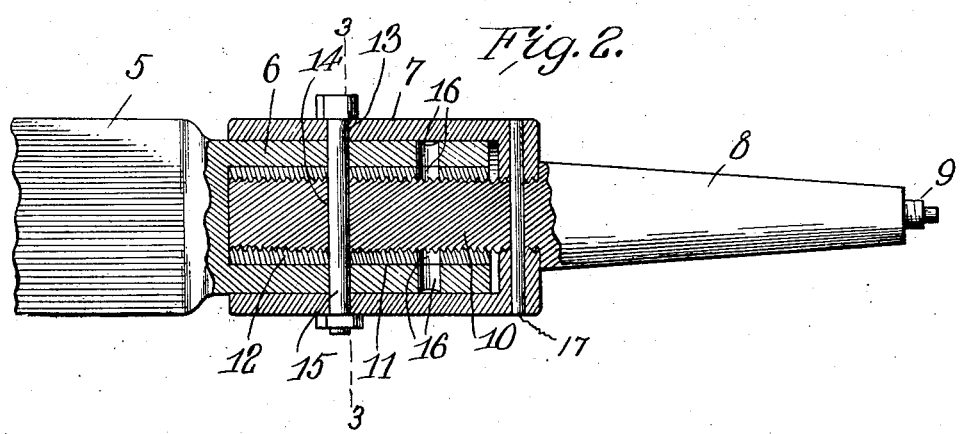
Figure 3:
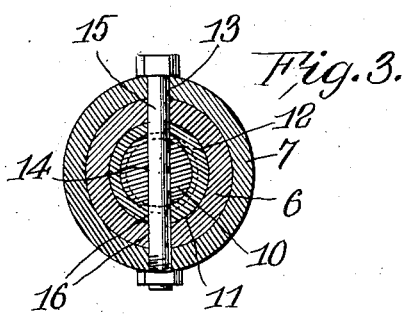

In the drawing:—Figure 1—is a side view showing the improved spindle in position upon the end of an axle. Fig. 2—is a longitudinal sectional elevation of the same. Fig. 3—is a transverse sectional view taken on the plane indicated by the line 3—3 in Fig. 2.

Corresponding parts in the several figures are denoted by like characters of reference.

The axle, 5, has a cylindrical terminal, 6, adapted to fit within the cylindrical sleeve, 7, of the spindle, 8, which latter is provided in the usual manner with a reduced screw-threaded extension, 9, for the reception of the axle-nut, not shown. The spindle has an externally threaded core, 10, extending axially through the cylindrical sleeve 7, and adapted to enter a recess or socket, 11, formed longitudinally in the cylindrical terminal 6 of the axle, said recess being preferably reinforced by a lining, 12, consisting of a piece of internally threaded metal tubing which may be secured in any suitable manner in the recess or socket 11, said lining or tubing being adapted to be engaged by the externally threaded core 10.

The cylindrical sleeve 7 and the core 10 of the spindle are provided with alining apertures, 13, 14, for the passage of a securing member such as a bolt, 15; and the cylindrical axle-terminal 6 with the lining or tubing 12 bedded therein is provided with a plurality of transverse apertures, 16, for the passage of the bolt or securing member 15 when the apertures 13, 14 are brought into registry with any of the sets of apertures 16, as will be very readily understood by reference to Fig. 2 of the drawing. It is obvious that by moving the spindles outward upon the ends of the axle, the gage will be widened, while by moving the spindles inward the gage will be made narrower. It will also be seen that by providing a sufficient number of apertures 16, properly spaced apart, any desired degree or scope of adjustment may be obtained.

In the drawing, and especially in Fig. 2, the sleeve 7 has been shown as being constructed separate from the spindle, it being mounted upon the threaded core or extension 10 of the latter, and secured in position by means of a transverse pin or key, 17. The improved spindle may be thus constructed in a very strong, durable and economical manner, and a thoroughly useful and efficient device will be provided.

From the foregoing description taken in connection with the drawing hereto annexed, the operation and advantages of this invention will be readily understood. The improved spindle may be readily and quickly adjusted to change the gage of the vehicle to which it is applied; the construction and operation being simple and efficient.

Having thus described my invention, I claim and desire to secure by Letters Patent of the United States:—

An axle having a cylindrical terminal provided with a longitudinal axial recess and an internally threaded lining in said recess, said terminal and lining being provided with a plurality of transverse apertures, a spindle having a cylindrical sleeve and an externally threaded core-extension said sleeve and core extension being provided with alining apertures, and a fastening member extending through the sleeve, the core-extension, the axle terminal and the lining.

In testimony whereof I affix my signature, in presence of two witnesses.

ATLANTA S. FREDERICK.

Witnesses:
 JOHN DONAKER,
 ALLEN BOZELL.